: US010127941B2

(12) United States Patent
Altknecht et al.

(10) Patent No.: US 10,127,941 B2
(45) Date of Patent: Nov. 13, 2018

(54) OPTICAL DISK DRIVE GUIDE

(71) Applicant: International Business Machines Corporation, Armonk, NY (US)

(72) Inventors: David J. Altknecht, San Jose, CA (US); John S. Best, San Jose, CA (US); William M. Dyer, San Jose, CA (US); A. David Erpelding, San Jose, CA (US); Steven R. Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/482,875

(22) Filed: Apr. 10, 2017

(65) Prior Publication Data

US 2018/0294009 A1 Oct. 11, 2018

(51) Int. Cl.
*G11B 17/02* (2006.01)
*G11B 17/028* (2006.01)

(52) U.S. Cl.
CPC .............. *G11B 17/0286* (2013.01)

(58) Field of Classification Search
None
See application file for complete search history.

(56) References Cited

U.S. PATENT DOCUMENTS

| | | | |
|---|---|---|---|
| 895,655 A | * | 8/1908 | Mitchell |
| 1,188,872 A | * | 6/1916 | Woerheide ........... A47B 81/067 312/9.58 |
| 1,291,924 A | * | 1/1919 | King .................... A47B 81/067 312/9.33 |
| 4,664,454 A | * | 5/1987 | Schatteman ......... G11B 17/022 206/308.1 |
| 4,875,743 A | * | 10/1989 | Gelardi .............. G11B 33/0444 206/308.1 |

(Continued)

FOREIGN PATENT DOCUMENTS

JP 08241561 A * 9/1996
JP 08321122 A * 12/1996

(Continued)

OTHER PUBLICATIONS

Grochowski et al., Technological Impact of Magnetic Hard Disk Drives on Storage Systems, IBM Systems Journal, vol. 43, No. 2, 2003, pp. 338-346.

(Continued)

*Primary Examiner* — William J Klimowicz
(74) *Attorney, Agent, or Firm* — Lieberman & Brandsdorfer, LLC (57) ABSTRACT

A method and apparatus is provided to enable loading and/or unloading of a storage drive. The body has a first end, a second end, and a path extending from the first end to the second end. The body is configured to receive the computer readable storage device and maintain the computer readable storage device in a first position. The body is configured to passively change orientation from a first orientation to a second orientation responsive to contact from the computer readable storage device. The first orientation maintains the first position of the computer readable storage drive and the second orientation facilitates traversal of the computer readable storage device along the path.

18 Claims, 10 Drawing Sheets

(56) References Cited

U.S. PATENT DOCUMENTS

| | | | | |
|---|---|---|---|---|
| 5,136,562 A * | 8/1992 | Staar | ....................... | G11B 17/22 360/98.01 |
| 5,683,153 A * | 11/1997 | Ohta | .................. | G11B 33/0477 211/40 |
| 5,848,034 A * | 12/1998 | Morioka | ................. | G11B 17/28 369/30.61 |
| 5,870,359 A * | 2/1999 | Furusawa | .............. | G11B 17/30 369/30.77 |
| 5,936,930 A * | 8/1999 | Bando | ................. | G11B 17/0405 369/30.9 |
| 5,953,293 A * | 9/1999 | Kajiyama | .............. | G11B 17/24 369/30.79 |
| 6,048,042 A * | 4/2000 | Chan | ................. | G11B 33/0472 312/9.11 |
| 6,332,656 B1 * | 12/2001 | Gaves | ................ | G11B 33/0444 312/9.14 |
| 6,680,882 B2 * | 1/2004 | Ikedo | ..................... | G11B 17/24 369/30.8 |
| 6,757,223 B1 * | 6/2004 | Ikedo | ..................... | G11B 17/24 369/37.01 |
| 6,940,787 B2 * | 9/2005 | Kajiyama | .............. | G11B 17/26 369/30.86 |
| 6,977,872 B2 * | 12/2005 | Nagone | ................. | G11B 17/24 369/30.79 |
| 7,650,988 B2 * | 1/2010 | Osada | ................. | G11B 33/0422 206/308.1 |
| 7,933,191 B2 | 4/2011 | Van Brocklin et al. | | |
| 8,042,123 B2 | 10/2011 | Terzis et al. | | |
| 8,341,653 B2 | 12/2012 | Terzis et al. | | |
| 8,385,163 B2 | 2/2013 | Goyal et al. | | |
| 9,230,591 B2 | 1/2016 | Kinoshita et al. | | |
| 2007/0039011 A1 * | 2/2007 | Wu | ....................... | G11B 17/054 720/604 |
| 2007/0201164 A1 | 8/2007 | Bauck et al. | | |
| 2017/0236544 A1 * | 8/2017 | Altknecht | ............ | G11B 17/038 720/706 |

FOREIGN PATENT DOCUMENTS

| | | | | |
|---|---|---|---|---|
| JP | 09073700 A | * | 3/1997 | |
| JP | 09128867 A | * | 5/1997 | ............. G11B 17/30 |
| JP | 2003085864 A | * | 3/2003 | ............. G11B 17/26 |
| WO | WO 9623306 A1 | * | 8/1996 | ......... G11B 33/0444 |

OTHER PUBLICATIONS

Thompson et al., The Future of Magnetic Data Storage Technology, IBM J. Res. Develop., vol. 44, No. 3, May 2000, pp. 311-322.

* cited by examiner

OPTICAL DISK DRIVE GUIDE

BACKGROUND

The present disclosure relates generally to an apparatus to support a position of a computer readable storage device in a storage chassis. More specifically, the embodiments of the disclosure relate to a method and system to passively change an orientation of the apparatus with respect to a storage chassis to facilitate a load and/or unload of the storage device.

A chassis for storage of a computer readable storage device comes in various forms. For example, the chassis may be configured to store a hard disk drive (HDD), a solid state drive (SDD), an optical disk drive, etc. It is understood that the internal and external configurations of the chassis may vary with respect to one or more internal components, and specifically the form of the storage device(s).

It is understood that the chassis for the optical disk drive may include an optical disk loader such as a tray loader or a slot loader. The optical disk loader includes an active mechanism to facilitate a process to load and/or unload an optical disk from the optical disk drive. In order to load the optical disk drive, the optical disk is placed in communication with the optical disk drive (e.g., into the tray or slot) and the optical disk drive pulls the optical disk into a position proximal to a spindle hub of the optical disk drive. The spindle hub changes position to engage an aperture of the optical disk and changes the position of the disk in order to rotate the optical disk without contacting the optical disk loader.

SUMMARY

The disclosed embodiments pertain to a method and system that supports a position of a computer readable storage device in a storage drive.

In one aspect, an apparatus is provided with a body in a first orientation having a first end and an oppositely disposed second end. The body is configured to receive a computer readable storage device and to maintain the device in a first position relative to a path extending from the first end to the second end. A pivot is operatively coupled to the body between the first end and the second end. The pivot is configured to facilitate an orientation change of the body between the first orientation and a second orientation that facilitates traversal of the device along the path. The device contacts the first end of the body and the body passively changes orientation from the first orientation to the second orientation responsive to the contact.

In yet another aspect, a method for supporting a computer readable storage device is provided. More specifically, a body having a first end and an oppositely disposed second end is positioned in a first orientation. The body is configured to receive a computer readable storage device and to maintain the device in a first position relative to a path extending from the first end to the second end. A pivot is configured operatively in communication with the body between the first end and the second end. The pivot is configured to facilitate an orientation change of the body between the first orientation and a second orientation that facilitates traversal of the device along the path. The device is moved along the path including the device contacting the first end of the body. The body passively changes orientation from the first orientation to the second orientation responsive to the contact. The orientation of the body is passively changed from the second orientation to the first orientation responsive to a removal of the contact of the device with the first end of the body.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Unless the meaning is clearly to the contrary, all references made herein to ranges are to be understood as inclusive of the endpoints of the ranges. The modifier "about" used in connection with a quantity is inclusive of the stated value and has the meaning dictated by the context (e.g., includes the degree of error associated with measurement of the particular quantity).

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
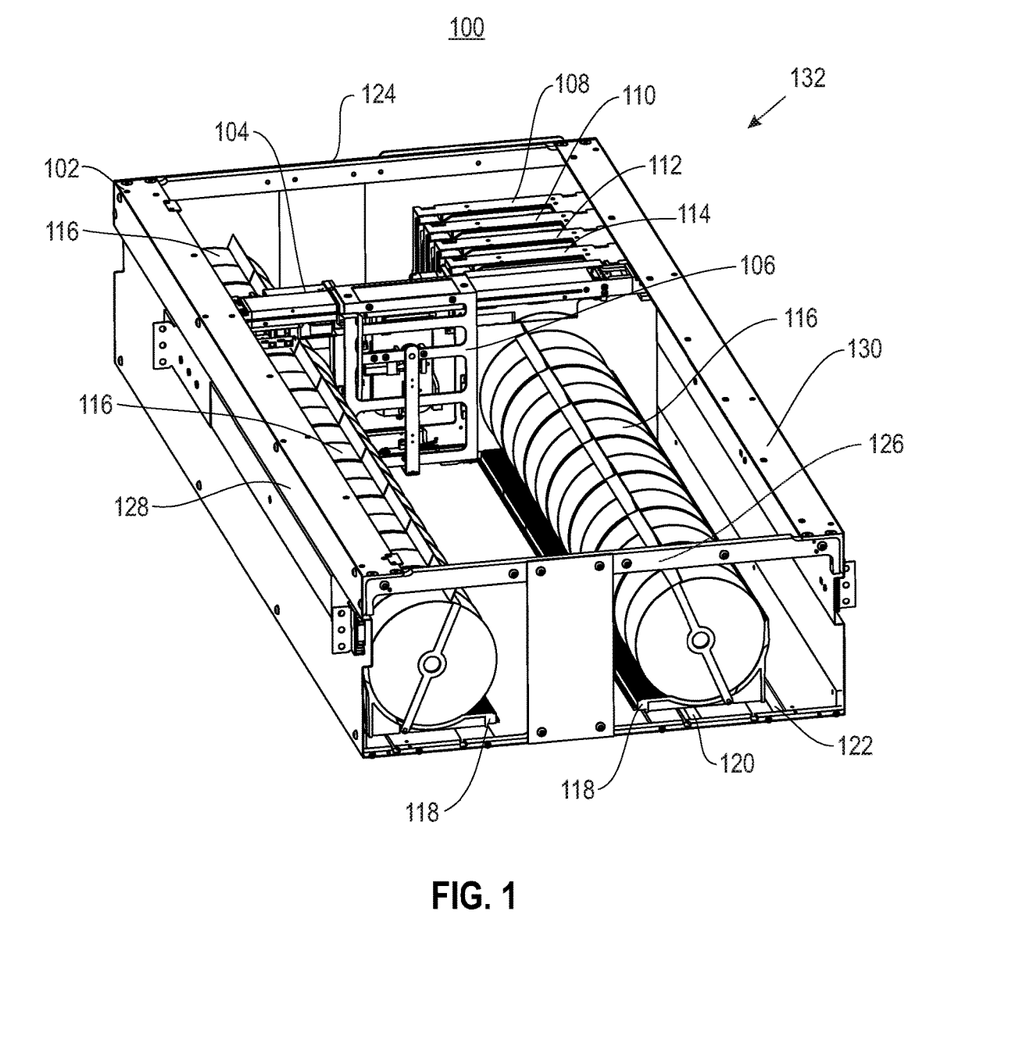
FIG. 1 depicts a diagram illustrating an optical storage system that supports loading and unloading of a disk.

It is understood that an optical disk library includes a plurality of optical disks, with one or more of the optical disks storing computer readable data. Referring to FIG. 1, a diagram (100) is provided illustrating an optical storage system (132) that supports loading and unloading of an optical disk with respect to an optical drive (108) housed in a chassis (102). In one embodiment, the optical storage system (132) includes the chassis (102), also referred to herein as an enclosure, an arm (104) connected to a disk retrieval unit (DRU) (106), optical disk drive(s) (ODD) (108), (110), (112), and (114), one or more optical disks (116), also referred to herein as a disk, disk cassette(s) (118), and tracks (120) and (122) to hold the disk cassette(s) (118) in place and external to the disk drive(s). In one embodiment, the arm (104) moves with the assistance of one or more motors and gears on tracks within the chassis (102). In one embodiment, the arm (104) is configured to move the DRU (106) from a first side (124) of the chassis (102) to a second side (126) of the chassis (102). Similarly, in one embodiment, the first side (124) is referred to as a back side, and the second side (126) is referred to as a front side. The DRU (106) is configured as a moveable component within the chassis (102) and with respect to third and fourth sides (128) and (130), respectively. Movement of the DRU (106) is configured to retrieve a disk (116) from disk cassette(s) (118) and place the retrieved disk (116) in the ODD (108), and/or replace the disk (116) from the ODD (108) to the disk cassette (118). In other embodiments, other configurations of stored disks (116), ODD (108), and the DRU (106) may be used for disk placement, transport and loading (e.g., ODDs (108)-(114) into a disk holder or disk cassette(s) (118)), etc. Accordingly, the optical storage system (132) is provided with a DRU (106) to facilitate movement of one or more disks (116) with respect to the ODD (108) for reading and writing data.

The chassis (102) functions as a platform to protect the one or more disks (116) from the environment. In one example, the chassis (102) includes filter material connected to cooling fans (not shown) and a top enclosure (not shown for internal viewing). In one embodiment, the chassis (102) may be sized for receipt and housing in a rack mounted device with rack mount connectors. Depending on space and a selected chassis size, the chassis (102) may have a greater capacity of ODDs (108)-(114), disk cassette(s) (118), and thus, disks (116). In one example, the disk cassette(s) (118) are placed within the chassis (102) adjacent to the third and/or fourth side (128) and/or (130), respectively, of the enclosure (102). In one example, additional disk cassette(s) (118) and disk(s) (116) space is available adjacent to the ODD (108). In one embodiment, a wider enclosure (102) may receive additional ODDs (116) adjacently positioned on the third and fourth sides, (128) and (130) of the enclosure (102) based on available space. Accordingly, the quantity of disks (116), ODDs (108)-(114), and disk cassette(s) (118) and the size of the enclosure (102) should not be considered limiting.

The DRU (106) is configured in communication with a robotic gripper (not shown) to engage a disk (116) proximal to the outer circumference of the disk. The robotic gripper, hereinafter referred to as the gripper, is configured to hold an individual disk until the DRU (106) positions the disk (116) in a select location, such as, but not limited to, one of ODDs (108)-(114) and one of disk cassette(s) (118). In one embodiment, ODD (108)-(114) are not provided with a tray and/or a slot loader, and the disk (116) is delivered directly to the proximity of the spindle hub by the robotic gripper. When the disk (116) is placed in one of ODDs (108)-(114), the spindle hub of the respective ODD engages the disk (116). The disk (116) is spun by the spindle hub at a predefined speed in order for the respective ODD to perform a read and/or write operation. The gripper may be required to hold the disk (116) while the disk (116) is loaded and/or unloaded from the spindle hub of the respective ODD in order to prevent the disk (116) from moving to an irretrievable position. In the irretrievable position, the disk (116) cannot be engaged by the gripper and/or the spindle hub of the respective ODD. It is understood that requiring the gripper to hold the disk (116) during a load and/or unload operation by the spindle hub degrades the performance of the optical storage system (132). In one embodiment, the degraded performance may introduce latency into a read and/or write operation supported by the optical storage system (132). Accordingly, enabling the gripper to load or unload a disk without requiring the hub to engage the disk increases efficiency of the optical storage system (132) and reduces latency.

As described herein, a method and apparatus are provided to enable loading and/or unloading of a computer readable storage device with respect to the chassis. In one embodiment, the loading and/or unloading is rapid. A position of the computer readable storage device is supported during loading and/or unloading. The supported position facilitates removal and insertion of the computer readable storage device with respect to the chassis. The body has a first end and a second end and a path extending from the first end to the second end. The body is configured to receive the computer readable storage device and to maintain the computer readable storage device in a first position. In one embodiment, the first position aligns an aperture of the computer readable storage device with a surface of a hub of the chassis. More specifically, the body is configured to passively change orientation from a first orientation to a second orientation responsive to contact from the computer readable storage device. The first orientation of the body supports the first position of the computer readable storage device and restricts the computer readable storage device from moving to an irretrievable position. Similarly, the second orientation of the body facilitates traversal of the computer readable storage device along the path. Accordingly, the body supports the computer readable storage device in the first position and the hub engages/disengages the computer readable storage device to/from the first position.

Figure 2:
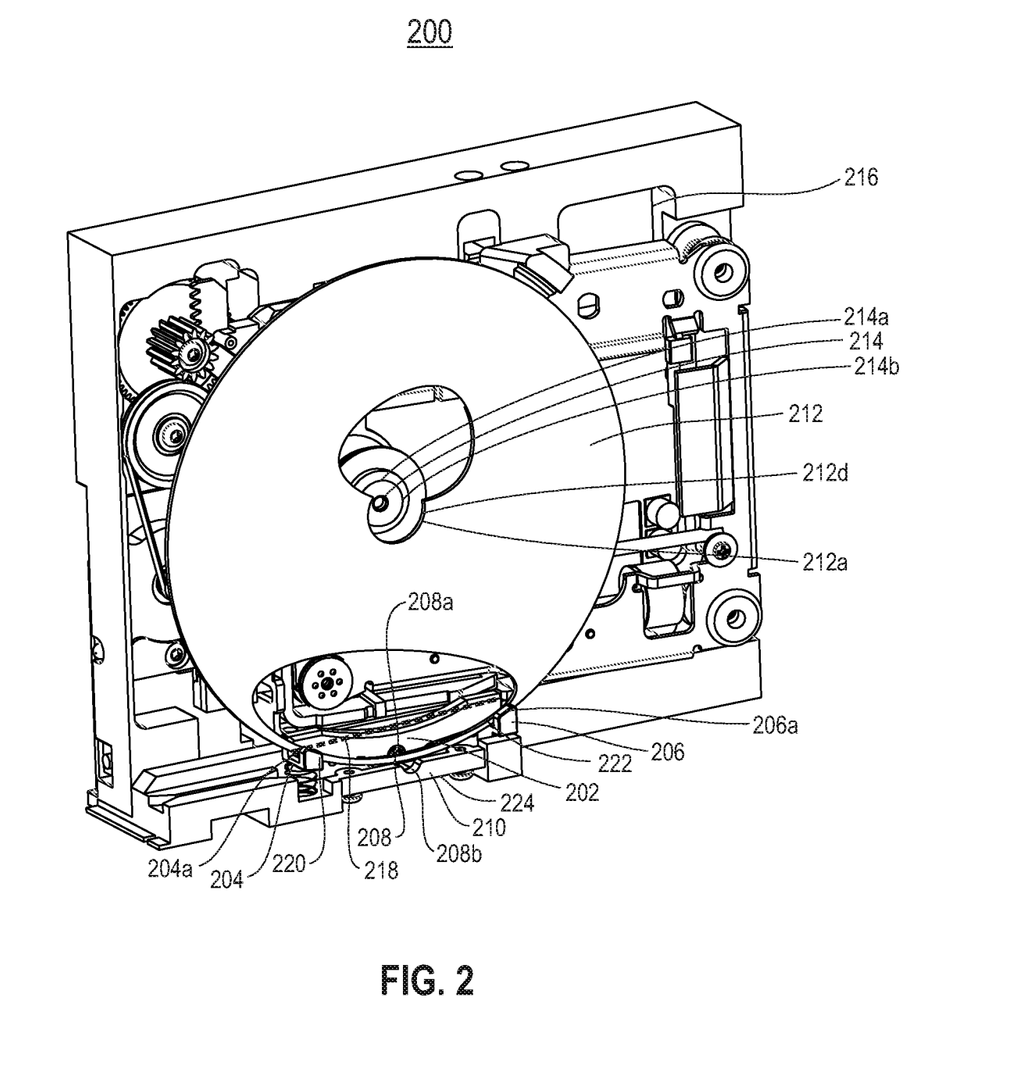
FIG. 2 depicts a diagram illustrating a front view of one embodiment of an apparatus in a first orientation to retain a computer readable storage device in a first position.

Referring to FIG. 2, a diagram (200) is provided illustrating a front view of one embodiment of an apparatus in a first orientation to retain the computer readable storage device in the first position. As shown, the apparatus includes a body (202) having a first end (204) and an oppositely disposed second end (206). The body (202) is shown herein in a first orientation. A path (218) extends from the first end (204) to the second end (206). The body (202) is operatively coupled to a pivot (208) which is positioned between the first end (204) and the second end (206). The pivot (208) is operatively coupled to a mount (210). In one embodiment, the mount is attached to the chassis (224) of the ODD (216). In one embodiment, the pivot (208) includes a pin (not shown) operatively coupled to the mount (210). An aperture (208a) is positioned in the body (202) in communication with and aligned with the pin. In one embodiment, the pivot (208) is a pin type hinge operatively coupled to the body (202), with the aperture (208b) in mount (210) in communication with and aligned with the pin. The pivot (208) facilitates orientation changes by the body (202), including an orientation change from the first orientation of the body (202) (FIG. 2) to a second orientation of the body, shown and described in FIG. 4. Pivot (208) provides an axis of rotation for the body (202). Accordingly, the pivot (208) facilitates the orientation change by providing a point for rotation.

As shown, the body (202) is configured to receive and support the computer readable storage device (212). In one embodiment, the computer readable storage device (212) is an optical disk, hereinafter referred to as a disk. The body (202) physically contacts the disk (212) in the first position. The contact maintains the disk (212) in a first position in relation to the path (218). The first end (204) has a first groove (204a) representing a shape of the first end of the body, with the groove (204a) sized to receive and support the disk (212) in the first position. Similarly, the second end (206) is configured with a second groove (206a) representing a shape of the second end of the body, with the groove (206a) sized to receive and to support the disk (212) in the first position. In the first orientation of the body (202) and first position of the disk (212), the first and second ends, (204) and (206) limit position changes of the disk (212) by physically contacting the disk (212). In one embodiment, the body (202) contacts the disk (212) in the first position at two or more points, including a first point (220) proximal to the first end (204) and a second point (222) proximal to the second end (206). In one embodiment, first point (220) is in first groove (204a) and second point (222) is in groove (206a). As shown, the body (202) is configured with a concave shape relative to the ODD (216), with the concave shape to maintain the disk (212) in the first position. The concave shape of the body (202) limits position changes of the disk (212). The concave shape of the body (202) corresponds to the shape of the disk (212) and physically contacts the disk (212) in order to prevent the disk (212) from separating from the body (202). More specifically, this limit of the position changes effectively maintains the aperture (212a) of the disk (212) in a position proximal to spindle hub (214). In one embodiment, the body (202) solely supports the disk (212) in the first position. In one embodiment, the ODD (216) is in a vertical orientation. Similarly, in one embodiment, gravity maintains the disk (212) in physical contact with the body (202). Accordingly, the first and second grooves (204a) and (206a) are configured to maintain the first position of disk (212) within ODD (216) by physically contacting the disk (212).

As shown, the ODD (216) is provided with a spindle hub (214), hereinafter referred to as hub (214). The hub (214) is configured with a surface (214a) which facilitates alignment of the disk (206) with the aperture (212a). In one embodiment, the surface (214b) is a gradient surface. In one embodiment, the surface (214b) is conical. In the first position, the aperture (212a) of the disk (212) is not engaged with hub (214). As shown, in the first position the aperture (212a) is in partial alignment with the surface (214a) of the hub (214). This partial alignment facilitates engagement of the aperture (212a) of the disk (212) by the surface (214a) of hub (214). In one embodiment, in the partial alignment, a perimeter (212d) of the aperture (212a) is not concentric with a perimeter (214b) of the hub (214). In one embodiment, the perimeter (212d) of the aperture (212a) is not in physical contact with the hub (214). In one embodiment, the center of aperture (212a) in the first position is a first distance from the mount (210). Accordingly, the disk (212) in the first position is fully supported by the body (202) in the first orientation and the disk (212) is prepared for engagement by the hub (214).

Figure 3:
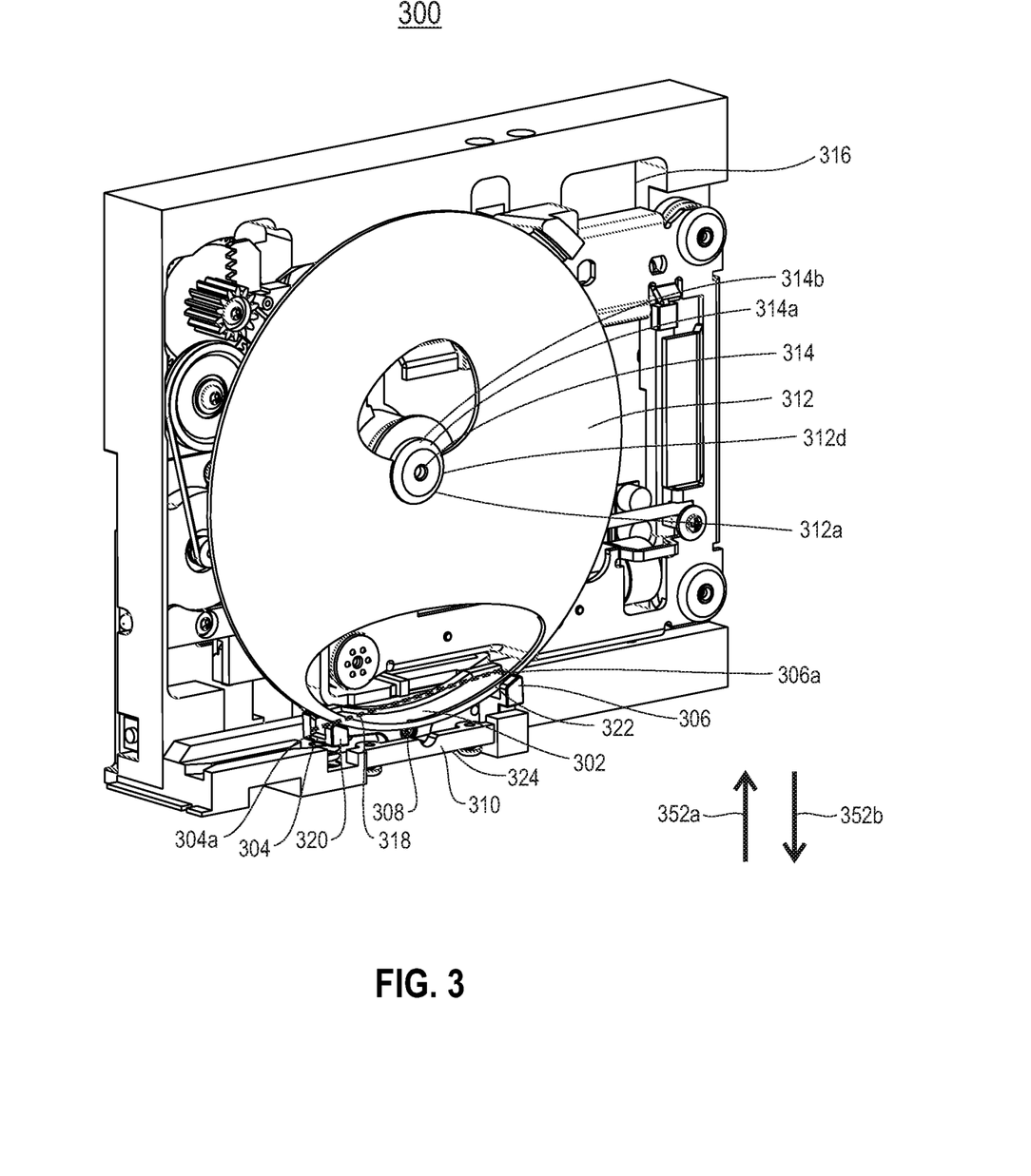
FIG. 3 depicts a diagram illustrating a front view of one embodiment of an apparatus in the first orientation to retain a disk in a second position.

As shown in FIG. 2, the disk (212) is in a first position and in partial alignment with the hub (214). When hub (214) engages disk (212), including an engagement of the aperture (212a) with the surface (214a), the position of the disk (212) is changed in relation to path (218), and specifically, the position changes from the first position to a second position. Referring to FIG. 3, a diagram (300) is provided illustrating a front view of one embodiment of an apparatus in the first orientation to retain a disk in the second position. As shown, the disk (312) has moved in a third direction (352a) from the first position (212) (see FIG. 2) to the second position (312) (see FIG. 3). The body (302) and the path (318) are shown in the first orientation. The body (302) is physically disengaged from the disk (312) in the second position. Specifically, the body (302) does not physically contact the disk (312) in the second position in relation to the path (318) including at the first point (320) proximal the first end (304) of the body (302) and the second point (320) proximal the second end (306) of the body (302). Accordingly, the position change of the disk (312) changes the communication between the disk (312) and the body (302) such that the disk (312) is not in physical contact with the body (302).

As shown, the surface (314a) of the hub (314) is shown engaged with the disk (312). In one embodiment, the engagement between the hub (314) and the disk is facilitated by a position change of the hub (314) from a first position to a second position. This engagement includes a second alignment of aperture (312a) with the hub (314) and holds the disk (312) in the second position. In one embodiment, in the second alignment, a perimeter (312d) of the aperture (312a) is concentric to a perimeter (314b) of the hub (314). In one embodiment, the perimeter (312d) of the aperture (312a) is in physical contact with the hub (314). The hub (314) facilitates a rotation of the disk (312) when the disk (312) is in the second position. The rotation is unimpeded by the body (302), including the first point (320) and the second point (322). In one embodiment, the hub (314) disengages (e.g. releases) the disk (312) from the aperture (312a), and the disk (312) moves in fourth direction (352b) changing from the second position (312) (FIG. 3) to the first position (212) (FIG. 2). In one embodiment, the center of aperture (312a) of the disk (312) in the second position is a second distance from the mount (310). In one embodiment, the body (312) is configured so that the distance between the first distance and the second distance is about 2 millimeters. In one embodiment, the hub (314) solely supports the disk (312) in the second position. Accordingly, the disk (312) in the second position is enabled to rotate without physically contacting the body (302).

Figure 4:
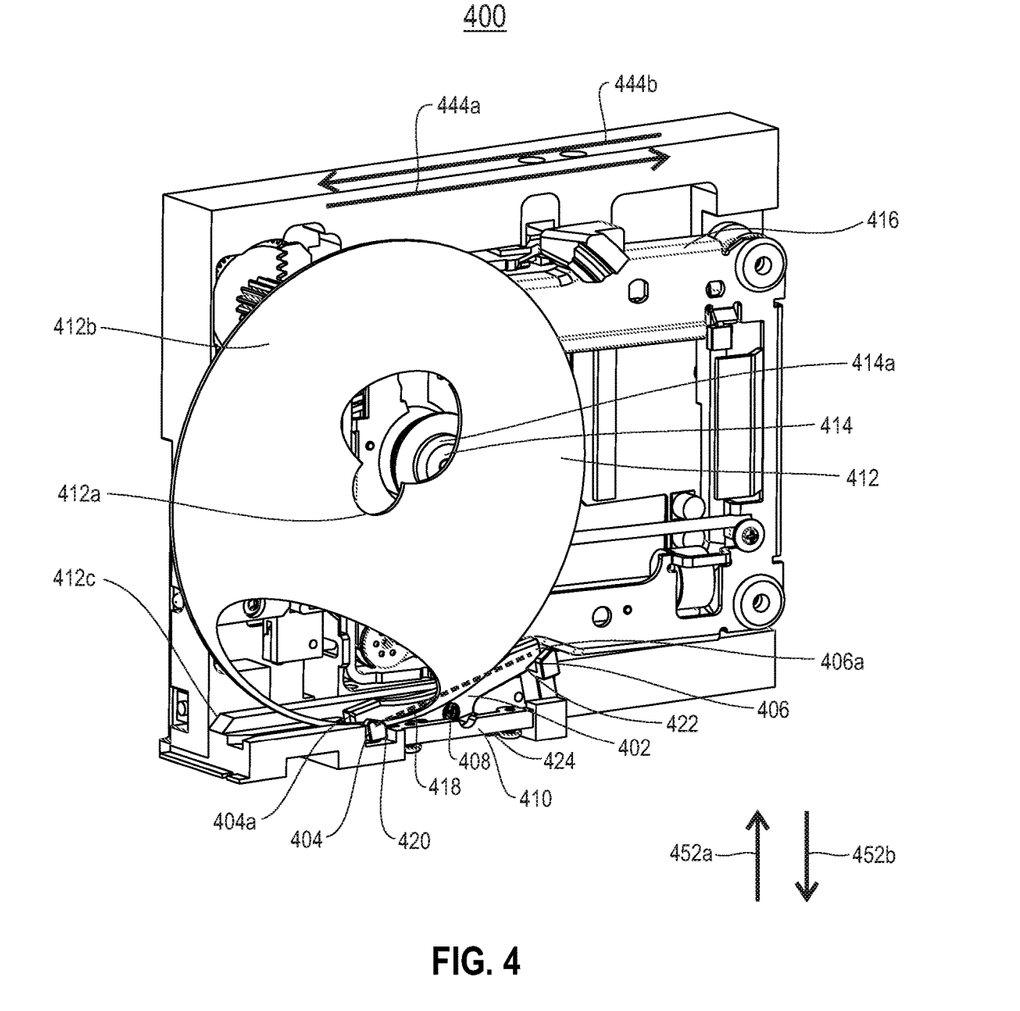
FIG. 4 depicts a diagram illustrating a front view of one embodiment of an apparatus in the second orientation to enable a disk to traverse a path.

In FIG. 3, the disk (312) is engaged by the hub (314) which facilitates a position change from the first position to the second position. The disk (212) of FIG. 2 may traverse the path (218), with the traversal facilitating a passive orientation change of the body (202). Referring to FIG. 4, a diagram (400) is provided illustrating a front view of one embodiment of the apparatus in the second orientation to enable the disk to traverse the path. As shown, the body (402) and path (418) are in the second orientation and the disk (412) is in a third position. The second orientation facilitates traversal of the disk (412) along the path (418) in a first direction (444a) and/or a second direction (444b). The pivot (408) facilitates the orientation change of the body (402) from the first orientation (202) (FIG. 2) to the second orientation (402) (FIG. 4). In one embodiment, the orientation change from the first orientation to the second orientation includes a counter-clockwise rotation of the body (402) around pivot (408). In one embodiment, the orientation change from the second orientation to the first orientation includes a clockwise rotation of the body (402) around pivot (402). In one embodiment, the ODD (416) is in a vertical orientation and directions (452a) and (452b) represent vertical directions. Accordingly, the body (402) changes orientation by rotation about pivot (408) to facilitate traversal of the path (418) by disk (412).

The body (402) physically contacts the disk (412) in the third position at the first point (420) proximal to the first end (404), and the body (402) does not physically contact the disk at the second point (422) proximal the second end (406). The physical contact of the disk (412) with the body (402) facilitates a passive change in orientation change of the body (402). For example, the groove (404a) of the first end (404) passively facilitates a counter-clockwise rotation of the body (402) from the first orientation (FIG. 2) to the second orientation (FIG. 4) responsive to the disk (412) contacting the first end (404) during a position change of the disk (412). The position change may be, but is not limited to, the disk (412) moving from the third position (FIG. 4) to the first position (FIG. 2) in first direction (444a) and the disk (412) moving from the first position (FIG. 2) to the third position (FIG. 4) in second direction (444b). In one embodiment, the facilitation of counter-clockwise rotation is a transfer of a force (e.g., more than a minimal force) exerted by disk (412) on the first end (404) due to movement of the disk (412). In one embodiment, the second end (406) passively facilitates a clockwise rotation of the body from the second orientation (FIG. 4) to the first orientation (FIG. 2) responsive to the disk contacting the second end (406) during a position change of the disk (412) from the third position (FIG. 4) to the first position (FIG. 2). Accordingly, the body (402) passively changes orientation responsive to a position change of the disk (412) including more than a minimal force to facilitate the clock-wise rotation of the body (402).

In the first orientation of the body (202) (see FIG. 2) and first position of the disk (212) (see FIG. 2), the first and second grooves (204a) and (206a) of the first and second ends, (204) and (206), limit travel of the disk (212) from the first position (see FIG. 2) to the third position (see FIG. 4). The limited travel prevents disk (212) (see FIG. 2) from moving (e.g. rolling) out of the first position (see FIG. 2) without a force (e.g., more than a minimal force) being exerted on the disk (212). The groove (204a) of the first end (404) limits position changes of the disk (412) in a direction(s) orthogonal to the first direction (444a) and third direction (452a). In one embodiment, the change in position of the disk (412) between the first and third position is solely a horizontal movement of the disk (412), wherein directions (444a) and (444b) are horizontal lines. Accordingly, the groove (204a) of the first end (404) of the body (402) provides a plurality of functionality including facilitating orientation changes of the body (402) and limiting travel of the disk (412).

Figure 5:
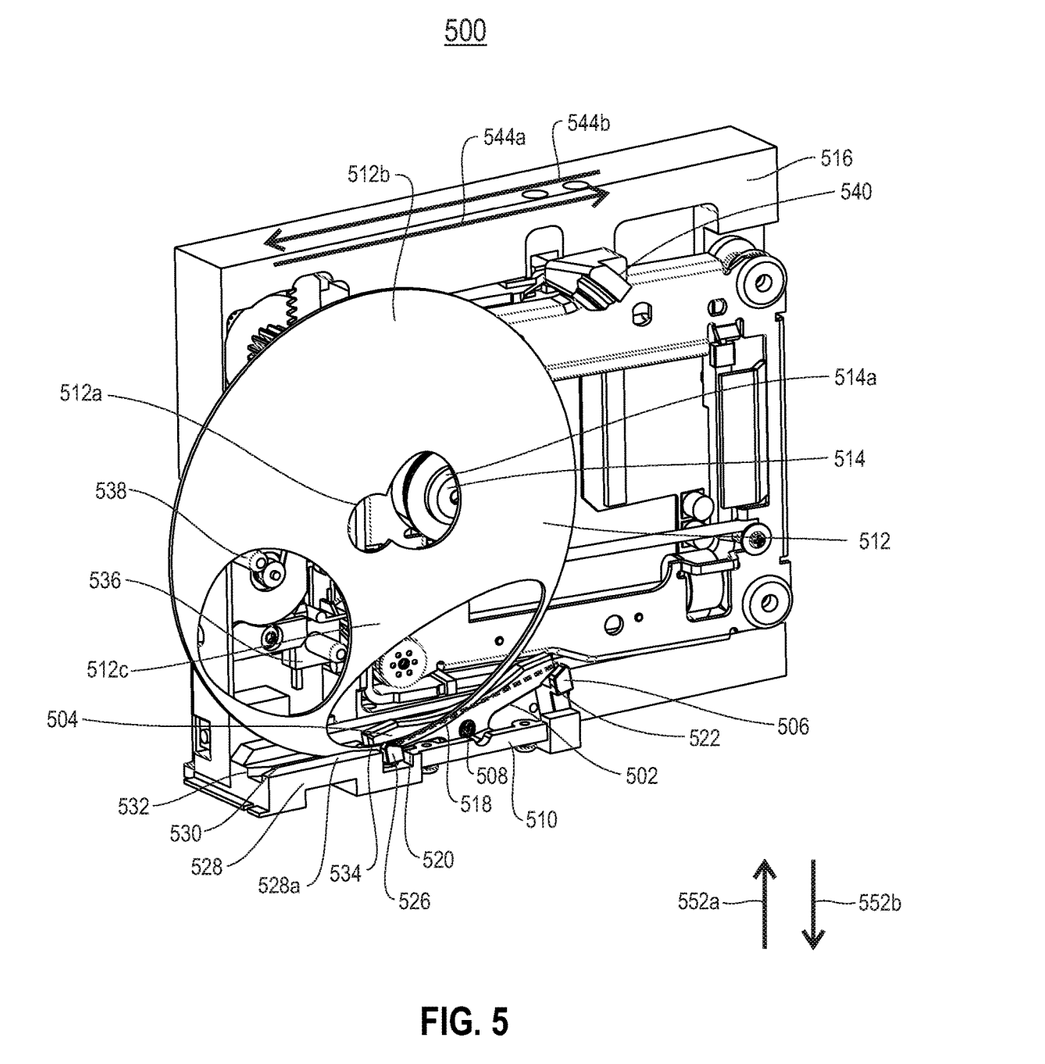
FIG. 5 depicts a diagram illustrating a front view of one embodiment of an apparatus in the second orientation having a guide to facilitate alignment of the disk.

As shown in FIG. 4, the disk (412) is in the third position and the body (402) is in the second orientation to facilitate movement of the disk (412) between the first and third positions. A guide may be provided in order to align the disk (412) with the body (402) during traversal of path (418) and/or limit position changes of the disk (412). Referring to FIG. 5, a diagram (500) is provided illustrating a front view of one embodiment of the apparatus in the second orientation having a guide to facilitate alignment of the disk. As shown, the body (502) and the path (518) are in the second orientation. The disk (512) is in the third position and in one embodiment in physical contact with the first point (520) proximal the first end (504) and is not in physical contact with the second point (522) proximal to the second end (506). Accordingly, the disk (512) is shown herein engaged with the first end (504) of the body (502) causing the body (502) to be in the second orientation.

As shown, mount (510) is provided with a guide portion (528) having a proximal end (532) and an oppositely disposed distal end (534), hereinafter referred to as guide (528). A slot (530) is embedded into a surface (528a) of the guide (528), with the slot (530) extending from the proximal end (532) to the distal end (534). The slot (530) is sized to receive the disk (512) and the slot (530) is sized to limit position changes of a bottom portion (512c) of the disk (512). The slot (530) is configured to align the disk (512) with the first end (504) of the body (502) and limit deviations from the first direction (544a) and/or the second direction (544b) during position changes. The limited directional deviation provided by slot (530) limits physical contact between the disk (512) and a component of the ODD (516). In one embodiment, the slot (530) limits position changes of a portion (512c) of disk (512) proximal to the body (502) in a direction(s) orthogonal to the direction of travel (e.g. first direction (544a) and/or second direction (544b)) and third direction (552a) of the disk (512). In one embodiment, the position changes of a portion (512b) of the disk (512) distal to the body (502) are limited by a gripper (not shown). In one embodiment, proximal end (532) and distal end (534) are tapered in order to facilitate a smooth transition of the disk (512) into and from guide (528). Accordingly, the guide (530) facilitates travel of the disk (512) in the first and/or second directions, (544a) and (544b), respectively, and limits deviation from the first and/or second directions (544a) and (544b), respectively.

One or more constraints may be provided such as, but not limited to, constraint (536), constraint (538), and constraint (540). Constraints (536)-(540) are operatively coupled to ODD (516). The constraints (536)-(540) limit a position change of the disk (512) within the ODD (516) by physically contacting the disk (512). The physical contact limits movement of the disk (512) to a position defined by each respective constraint (536)-(540). Limiting the movement of the disk (512) limits physical contact between the disk (512) and a component (not shown) in the ODD (512). Accordingly, one or more constraints may be provided in order to limit position changes of the disk (512).

A resilient member (526) is operatively coupled to the body (502) and the mount (508), and in one embodiment, the resilient member (526) may be positioned between the body (502) and the mount (508). The resilient member (526) is configured to change the orientation of the body (502) from the second orientation to the first orientation. In the second orientation of the body (502), the resilient member (526) exerts a force on the body (502), with the force causing the body (502) to rotate around pivot (508) and change the orientation from the second orientation to the first orientation. The disk (512) is enabled to exert a force stronger than the force exerted by the resilient member (526) in order to facilitate the orientation change. Since the force exerted by the disk (512) is stronger than the force exerted by the resilient member (512), the body (502) passively changes orientation (512) from the first orientation upon physical contact with disk (512) and the body (502) is passively restored to the first orientation after the physical contact is reduced such that the force exerted by the resilient member (526) overcomes the force exerted by the disk (512). In one embodiment, the resilient member may be, but is not limited to, a spring or a piston. In one embodiment, the resilient member is an active mechanical device to control the orientation change of the body (502), such as an actuator. The resilient member (526) may be positioned proximal to the first end (504) of the second (502). In one embodiment, the resilient member (526) is incorporated into the pivot (508). In one embodiment, there are two resilient members. Accordingly, the quantity, type, and position of the resilient member(s) should not be considered limiting.

Figure 6:
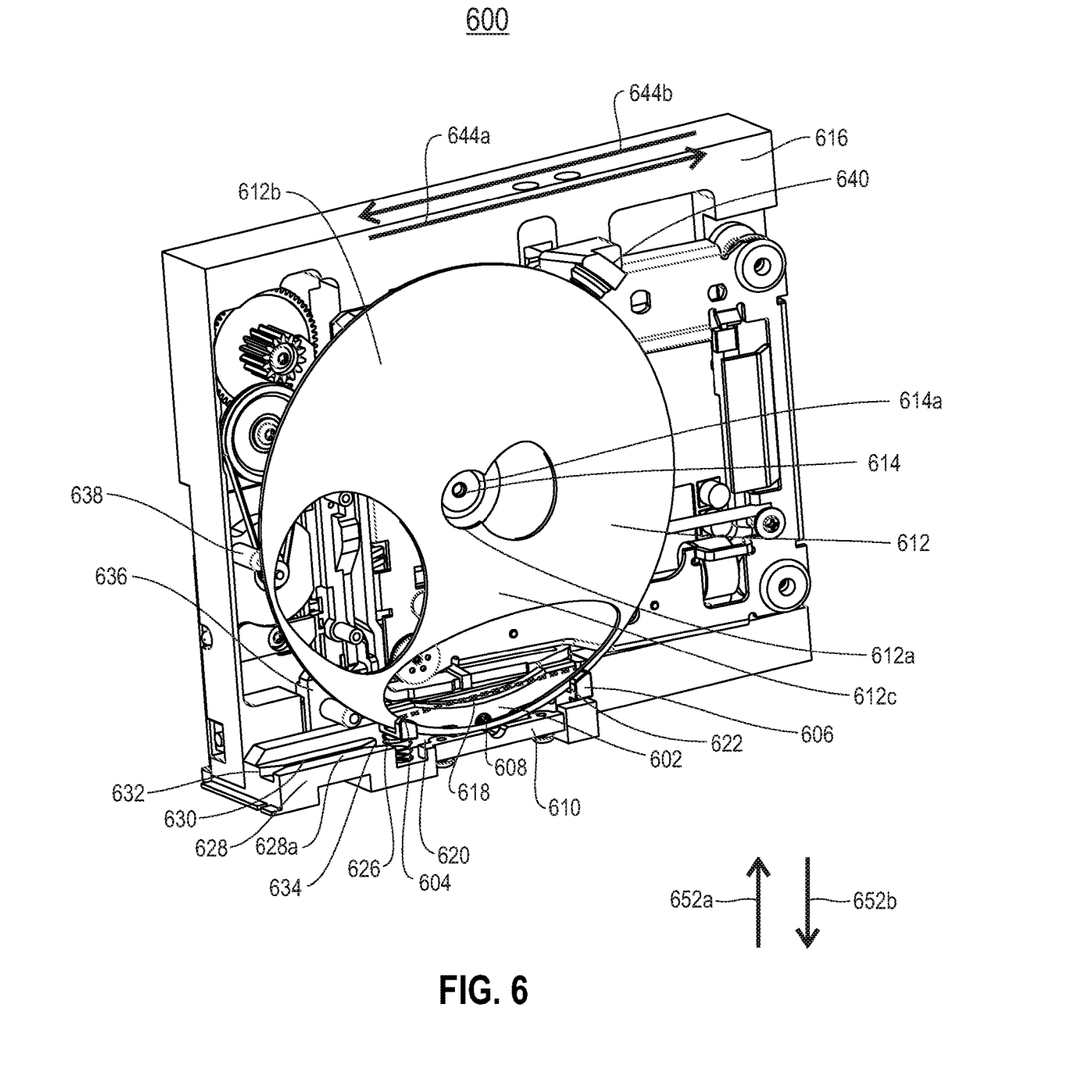
FIG. 6 depicts a diagram illustrating a front view of one embodiment of an apparatus in the first orientation to maintain the disk in the first position.

As shown in FIG. 5, the constraints (536)-(540) permit the disk (512) to change position from the third position to the first position and from the first position to the third position while limiting deviations from directions (544b) and (544a). Referring to FIG. 6, a diagram (600) is provided illustrating a front view of one embodiment of the apparatus in the first orientation to maintain the disk in the first position. As shown, the body (602) and the path (618) are in the first orientation to support the first position of the disk (612). The disk (612) is in physical contact with the first point (620) proximal to the first end (604) of the body (602) and the second point (622) proximal to the second end (606) of the body (602). As shown, slot (630) is not in communication with the disk (612). In the first orientation of the body (602), the resilient member (626) is in a relaxed state and exerts a minimal and/or a zero force on the body (602). More specifically, the relaxed state does not cause the body (602) to rotate around pivot (608) (e.g. the body (602) is stationary). However, upon counter-clockwise rotation of body (602) the resilient member (626) exerts a first force on the body (602) with the exerted force increasing proportionally to an increase in an angular deviation of the body (602) from the first orientation of the body (602). In one embodiment, upon clockwise rotation of body (602) the resilient member (626) exerts a second force on the body (602), with the second force increasing proportional to an increase in an angular deviation of the body (602) from the first orientation of the body (602). The second force is applied to the body (602) in a direction opposite from a direction of the first force. Accordingly, the first orientation of the body (602) is maintained by resilient member (526) and the first orientation supports the first position of the disk (612).

Constraints (636)-(640) are positioned adjacent to the disk (612) and function to limit the movement of the disk in a direction orthogonal to first and third directions, (644a) and (652a), respectively. The constraints (636)-(640) limit deviations from the first and second directions, (644a) and (644b). Additionally, constraint (640) limits the movement of the disk (612) in a direction parallel to the first and second directions, (644a) and (644b), respectively. For example, constraint (640) prevents a position change in the first direction (644a) beyond the first position of the disk (640) by physically contacting the disk (612). Accordingly, the constraints (636)-(640) provide further limitations on position changes of the disk (612) than provided by the body (602) and/or guide (628).

Figure 7:
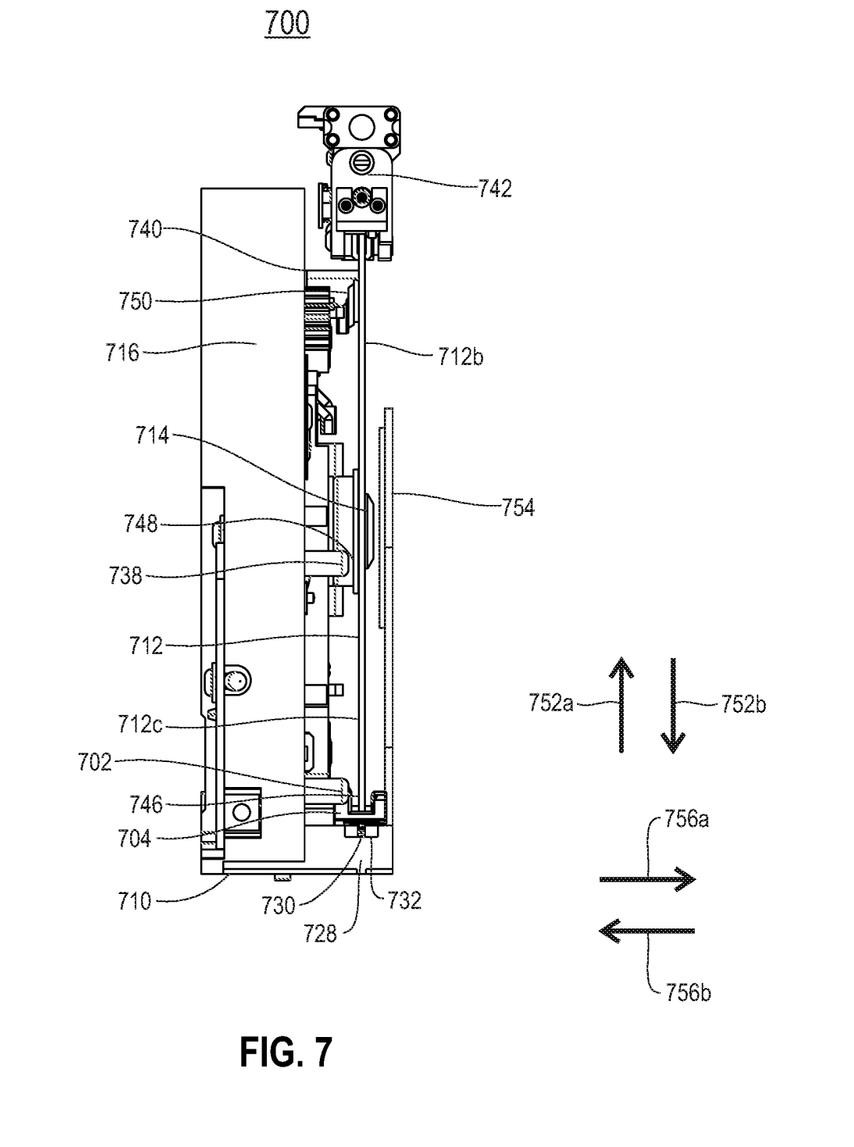
FIG. 7 depicts a diagram illustrating a side view of one embodiment of an apparatus in the first orientation and a disk in the second position.

Referring to FIG. 7, a diagram (700) is provided illustrating a side view of one embodiment of the apparatus in the first orientation and the disk in the second position. As shown, the body (702) is in the first orientation and the body (702) is not in physical contact with the disk (712) in the second position. A gap (746) is positioned along the body (702) from the first end (704) to the second end (not shown) and adjacent to the disk (712). The constraints (738)-(740) and are not physically contacting the disk (712). A gap (748) is positioned between the constraint (738) and the disk (712) in the second position. Similarly, a gap (750) is positioned between the constraint (740) and the disk (712) in the second position. The gaps (746)-(750) permit unimpeded rotation of the disk (712) around hub (714). During engagement of the hub (714) with the disk (712), the hub (714) is coupled to an adjacently positioned hub clamp (754). During disengagement (e.g. release) of the hub (714) with the disk (712), the hub is not coupled to the hub clamp (754). In one embodiment, the coupling between the hub (714) and the hub clamp (754) is magnetic. In one embodiment, the hub (714) solely supports the second position of the disk (712). In one embodiment, the hub clamp (754) is positioned adjacent to disk (712) and functions to limit the movement of the disk in a fifth direction (756a). In one embodiment, the constraints (738) and (740) function to limit movement of the disk in a sixth direction (756b). Accordingly, the constraints (738)-(740) and the body (702) do not interfere with the rotation of the disk (712) in the second position by hub (714).

As shown, the gripper (742), hereinafter referred to as the gripper, is positioned proximal to disk (712) on a portion (712b) of the disk (712) distal to the body (702). The gripper (742) facilitates a position change of the disk (712) in relation to the path (718) by intermittent engagement of the disk (712). For example, the gripper (742) facilitates movement of the disk (712) between the first and third positions by engaging the disk (712). The gripper (742) is configured to change engagement with the disk (712) (e.g. engage and/or disengage) in the first positioned and/or the second position. During engagement of the gripper (742) with the disk (712), the gripper is in physical contact with the portion (712b) of the disk (712) distal to the body (702). During, disengagement, the gripper (742) is not in physical contact with the portion (712b) of the disk (712) and the disk (712) may rotate in the second position unimpeded by the gripper (742). In one embodiment, the gripper (742) facilitates movement of the disk (712) from the ODD (716) to a storage location (not shown) and/or a second ODD (not shown). In one embodiment, the gripper (742) can change engagement with the disk (712) (e.g. engage and/or disengage) at the storage location and the second ODD. Accordingly, the gripper (742) facilitates movement of the disk (712) between the first and/or second to the third position and the body (702) passively changes orientation responsive to the movement.

Figure 8:
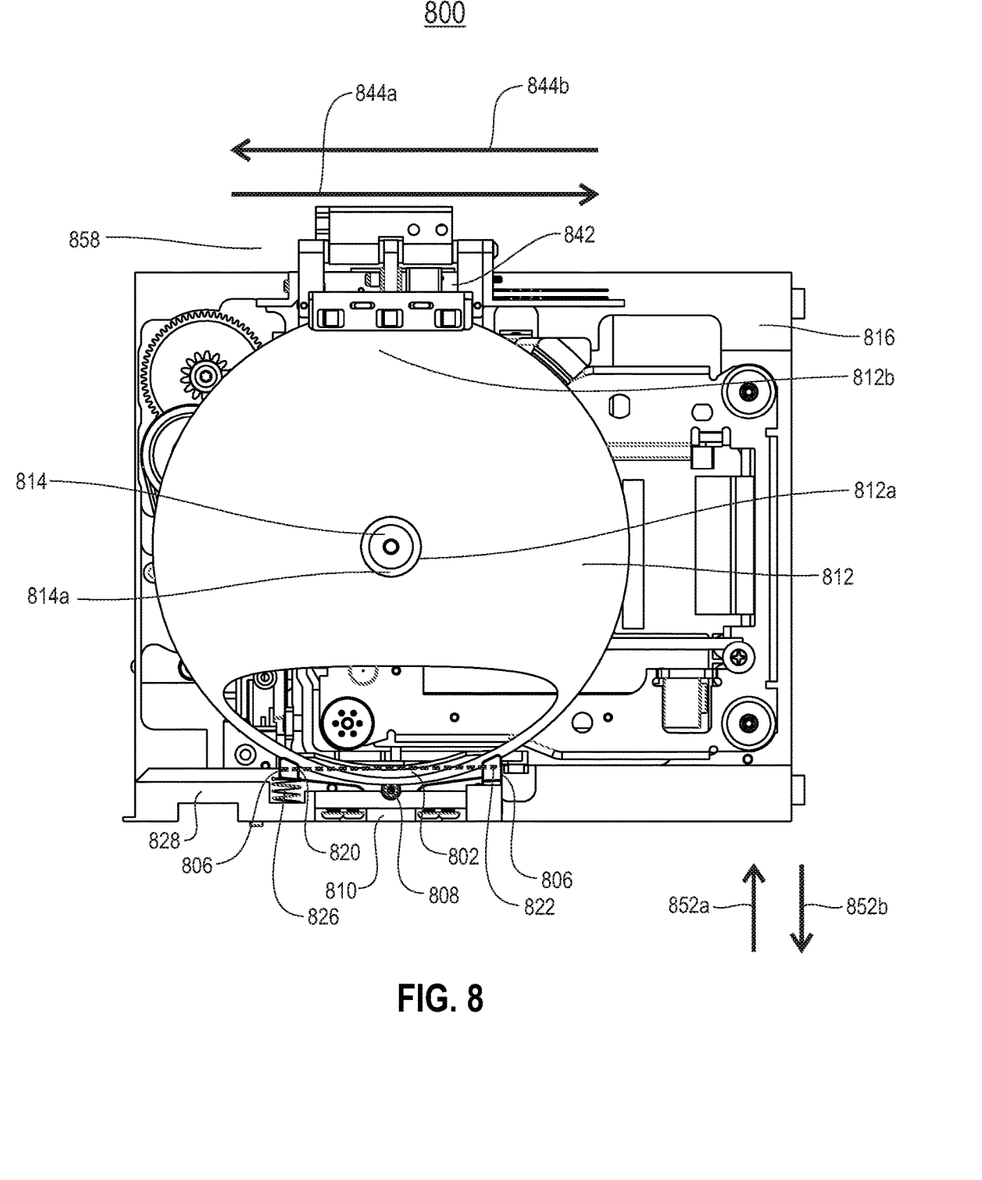
FIG. 8 depicts a diagram illustrating a front view of one embodiment of an apparatus in the first orientation and a disk in the second position.

Referring to FIG. 8, a diagram (800) is provided illustrating a front view of one embodiment of an apparatus in the first orientation and a disk in the second position. As shown, body (802) and path (818) are in the first orientation and the body (802) is in physical contact with the disk (812) in the first position. The gripper (842) is positioned proximal to disk (812) on a portion (812b) of the disk (812) distal to the body (802). ODD (816) is configured to receive the gripper (842) and the disk (812). The gripper (842) facilitates a position change of disk (812) in relation to path (818). ODD (816) is provided with an opening (858) proximal to the gripper (842) that enables the gripper to facilitate a position change of the disk (812) including retrieve/place the disk (812) from/to the first position of the disk (812). In one embodiment, the opening (858) enables the robotic gripper to travel in second direction (844b) to exit the ODD (816) with or without the disk (812). In one embodiment, the gripper (842) facilitates movement of the disk (812) between the first and third positions in the first direction (844a) and/or the second direction (844b). The gripper (842) is configured to engage and/or disengage the disk (812) in the first position and/or the second position. Accordingly, the gripper (842) is configured to engage and/or disengage the disk (812) in the first position and/or the second position.

Figure 9:
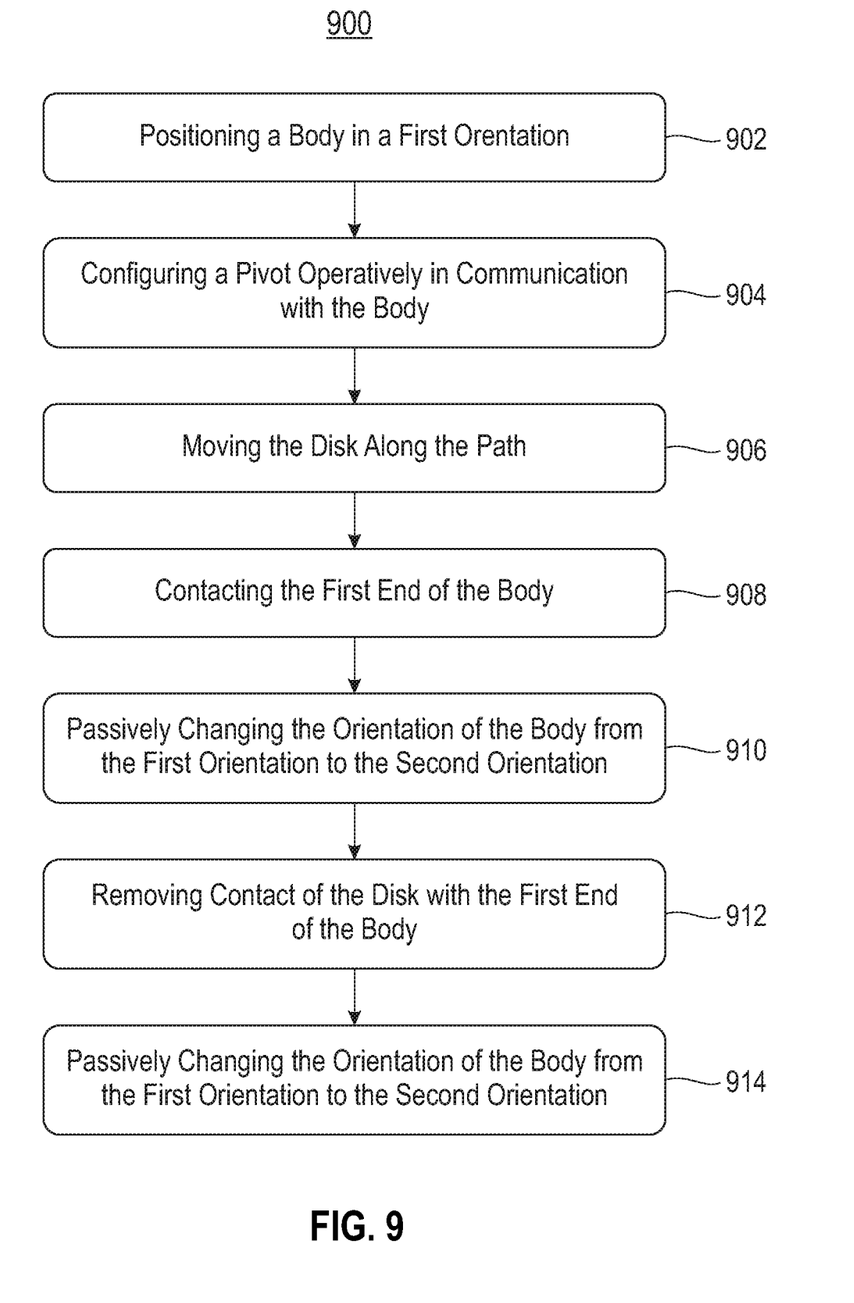
FIG. 9 depicts a flow chart illustrating a method to support a computer readable storage device in the first position.

In FIGS. 1-8 the functions and structure of embodiments of a computer readable storage device system were described. Referring to FIG. 9, a flow chart (900) is provided illustrating a method to support a computer readable storage device in the first position. As shown, the body is positioned in the first orientation (902). The body has a first end and an oppositely disposed second end with the path extending from the first end to the second end. The body is configured to receive a computer readable storage device (e.g., disk) and maintain the disk in the first position. In one embodiment, the positioning of the body at step (902) includes positioning the body within the ODD. In one embodiment, the body is operatively coupled to the chassis of the ODD. The pivot is configured to be operatively in communication with the body (904). The pivot is positioned between the first and second end of the body. The pivot is configured to facilitate orientation changes of the body between the first orientation and the second orientation. Accordingly, the body in the first orientation is enabled to passively change orientations facilitated by the pivot.

As shown, the disk is moved along the path (906). In one embodiment, the movement includes aligning the disk with the first end of the body utilizing a guide operatively coupled to the body. In one embodiment, the movement includes intermittently operatively coupling the disk to the gripper, wherein the gripper provides a force on the disk to facilitate the movement. The movement includes contacting the first end of the body (908). The contact causes a passive change in the orientation of the body from the first orientation to the second orientation. The second orientation of the body facilitates traversal of the path by the disk. In one embodiment, the passive orientation change is a rotation of the body around the pivot. Accordingly, the body passively changes orientation responsive to the disk traversing the path and exerting more than a minimal force on the body.

The contact between the disk and the body is removed (912). In one embodiment, the removal is a partial removal. In one embodiment, the removal of the contact is a positioning of the disk in the first position. In one embodiment, the removal of the contact is a removal of the disk from the first position to a position outside of the ODD. Following removal of the contact, the body passively changes orientation from the first orientation to the second orientation (914). In one embodiment, the first orientation is restored by a resilient member. The first orientation maintains the disk in the first position and physically supports the disk. In one embodiment, the passive orientation change is a rotation of the body around the pivot. Accordingly, the body passively changes orientation in order to allow the disk to traverse the path and to support the disk in the first position.

Figure 10:
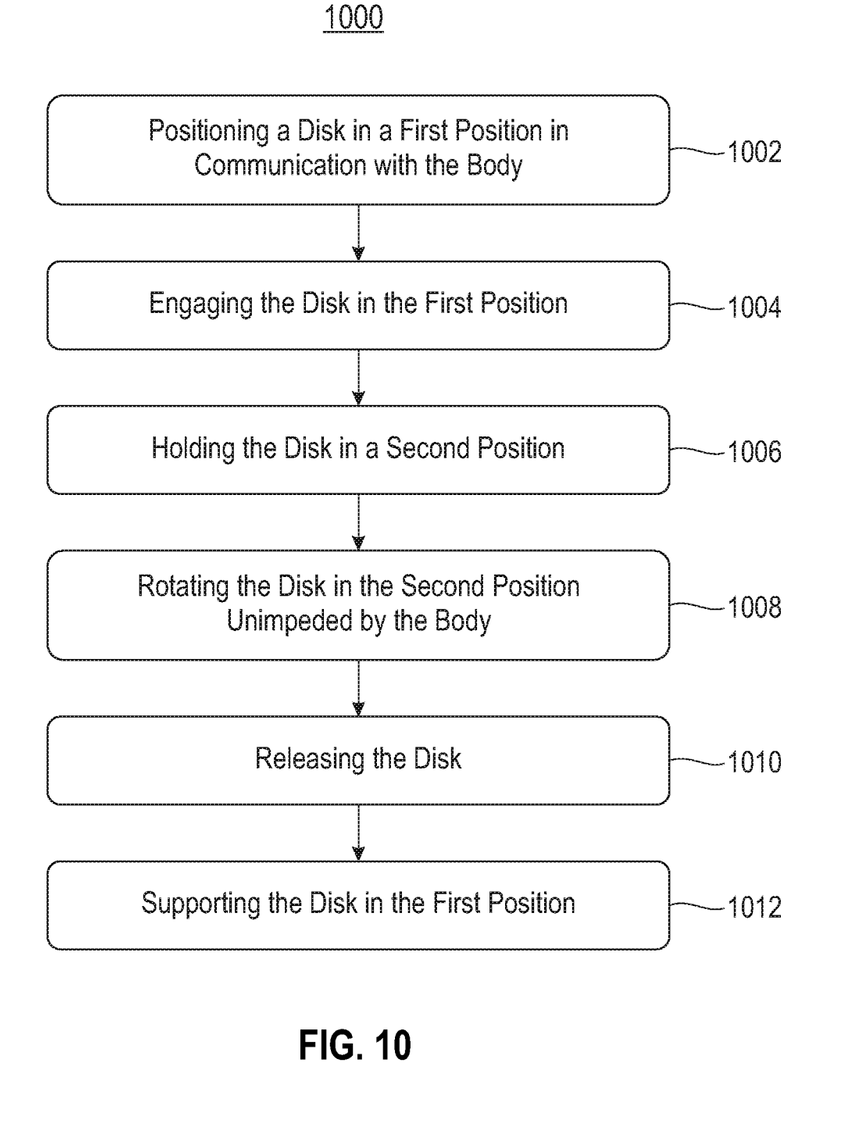
FIG. 10 depicts a flow chart illustrating a method to engage a surface of a computer readable storage device in the first position.

Referring to FIG. 10, a flow chart (1000) is provided illustrating a method to engage a surface of a computer readable storage device in the first position. As shown, a computer readable storage device (e.g., disk) is in the first position in communication with the body in the first orientation (1002). The first orientation of the body maintains the disk in the first position. In one embodiment, the body is within an ODD and in communication with the pivot to facilitate orientation changes of the body. The hub of the ODD engages the disk (1004) and holds the disk in the second position (1006). The disk is rotated in the second position by the hub (1008). In one embodiment, the disk is rotated to support one or more read and/or write operations by the ODD. The rotation of the disk is unimpeded by the body. In one embodiment, the hub solely supports the disk in the second position. Upon consummation of the read and/or write operation, the rotation of the disk is stopped by the hub, and the hub releases the disk (1010). The release of the disk includes a disengagement of the disk by the hub which changes the position of the disk from the second position to the first position. The body supports the disk in the first position. In one embodiment, the gripper retrieves the disk from the first position. In one embodiment, the position change of the disk is restricted within the ODD utilizing a constraint. Accordingly, the disk can be engaged and/or disengaged by the hub with only the body to support the first position of the disk.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the embodiments for various embodiments with various modifications as are suited to the particular use contemplated. Accordingly, the implementation of body to support a computer readable storage device in a storage drive enables rapid loading and unloading of the storage drive.

It will be appreciated that, although specific embodiments have been described herein for purposes of illustration, various modifications may be made without departing from the spirit and scope of the embodiments. In particular, the body may not be operatively coupled to a pivot and is instead in a fixed position. In the fixed position the gripper moves in at least two directions in order to place the disk in the body. Accordingly, the scope of protection of the embodiments is limited only by the following claims and their equivalents.

What is claimed is:

1. An apparatus comprising:
    a body in a first orientation, the body having a first end and an oppositely disposed second end, and a path extending from the first end to the second end, the body configured to receive a computer readable storage device and to maintain the device in a first position relative to the path, a resilient member operatively coupled to the body, the resilient member biasing the body to the first ordination;
    a pivot operatively coupled to the body between the first end and the second end, the pivot configured to facilitate an orientation change of the body between the first orientation and a second orientation; and
    the device contactable with the first end of the body, and the body passively changeable from the first orientation to the second orientation responsive to contact of the device with the first end of the body, the second orientation to facilitate traversal of the device along the path, wherein a force exerted by the device onto the body by the device at least substantially overcomes the bias provided by the resilient member on the body, causing the body to passively change from the first orientation to the second orientation.

2. The apparatus of claim 1, further comprising a hub positioned relative to the body and configured to receive the device from the first position and to hold the device in a second position.

3. The apparatus of claim 2, wherein the device is an optical disk, and the second position of the disk enables a rotation of the disk by the hub unimpeded by the body.

4. The apparatus of claim 3, wherein the hub releases the disk, the disk is supported in the first position by the body.

5. The apparatus of claim 3, wherein the hub further comprises a surface configured to engage an aperture of the disk.

6. The apparatus of claim 3, further comprising the body positioned within an optical disk drive having the hub.

7. The apparatus of claim 6, further comprising a constraint operatively coupled to the optical disk drive, wherein the constraint limits a position change of the disk within the optical disk drive.

8. The apparatus of claim 6, wherein the optical disk drive is in a vertical orientation.

9. The apparatus of claim 2, further comprising:
    a guide operatively coupled to the body, the guide having a proximal end and an oppositely disposed distal end, the distal end of the guide located proximal to the first end of the body; and
    a slot embedded in a first surface of the guide extending from the proximal end to the distal end, the slot to align the device with the first end of the body.

10. The apparatus of claim 9, wherein the device is intermittently operatively coupled to a robotic gripper, wherein the robotic gripper is configured to move the device along the path.

11. The apparatus of claim 10, wherein the robotic gripper is positioned on a portion of the device distal to the guide.

12. The apparatus of claim 1, wherein the device is an optical disk, and wherein the body has a concave shape, wherein the concave shape is configured to maintain the disk in the first position.

13. The apparatus of claim 1, wherein the device is held in the first position solely by the body.

14. The apparatus of claim 1, wherein the path is contiguous from the first end of the body to the second end of the body.

15. The apparatus of claim 1, wherein the body is single entity operatively coupled to the pivot.

16. The apparatus of claim 1, wherein the body is further passively changeable from the first orientation to the second orientation at least partially due to a first force exertable by the computer readable storage device, wherein the extertable first force is greater than a second force exertable by the resilient member.

17. The apparatus of claim 1, wherein the body is passively changeable from the first orientation to the second orientation exclusively due to the force exerted by the computer readable storage device.

18. A system comprising:
    an optical disk drive comprising:
        a body in a first orientation, the body having a first end and an oppositely disposed second end, and a path extending from the first end to the second end, the body configured to receive a computer readable storage device and to maintain the device in a first position relative to the path, a resilient member operatively coupled to the body, the resilient member biasing the body to the first ordination; and
        a pivot operatively coupled to the body between the first end and the second end, the pivot configured to facilitate an orientation change of the body between the first orientation and a second orientation; and
    a robotic gripper intermittently operatively coupled to the storage device, wherein the robotic gripper is configured to move the storage device along the path, the storage device contactable with the first end of the body as a result of movement of the storage device along the path, and the body passively changeable from the first orientation to the second orientation responsive to contact of the device with the first end of the body, the second orientation to facilitate traversal of the storage device along the path, wherein a force exerted by the device onto the body by the device at least substantially overcomes the bias provided by the resilient member on the body, causing the body to passively change from the first orientation to the second orientation.

* * * * *